United States Patent
Wu et al.

(10) Patent No.: US 10,882,996 B2
(45) Date of Patent: Jan. 5, 2021

(54) METHODS FOR FORMING CRYSTALLINE METAL OXIDE OVER STRUCTURAL COLOR FILM USING LOW HEAT

(71) Applicant: Toyota Motor Engineering & Manufacturing North America, Inc., Plano, TX (US)

(72) Inventors: Songtao Wu, Ann Arbor, MI (US); Debasish Banerjee, Ann Arbor, MI (US); Hongfei Jia, Ann Arbor, MI (US); Krishna Reddy Gunugunuri, Ann Arbor, MI (US)

(73) Assignee: Toyota Motor Engineering & Manufacturing North Amercia, Inc., Plano, TX (US)

( * ) Notice: Subject to any disclaimer, the term of this patent is extended or adjusted under 35 U.S.C. 154(b) by 0 days.

(21) Appl. No.: 16/258,065

(22) Filed: Jan. 25, 2019

(65) Prior Publication Data
US 2020/0002541 A1    Jan. 2, 2020

Related U.S. Application Data

(60) Provisional application No. 62/692,391, filed on Jun. 29, 2018.

(51) Int. Cl.
C09C 1/00    (2006.01)
(52) U.S. Cl.
CPC .......... C09C 1/0015 (2013.01); C09C 1/0078 (2013.01); C09C 2200/1004 (2013.01)
(58) Field of Classification Search
CPC .............. C09C 1/0015; C09C 1/0078
See application file for complete search history.

(56) References Cited

U.S. PATENT DOCUMENTS

| | | | |
|---|---|---|---|
| 4,146,403 | A | 3/1979 | Armanini et al. |
| 4,808,231 | A | 2/1989 | Kondis |
| 5,607,504 | A | 3/1997 | Schmid et al. |
| 5,624,486 | A | 4/1997 | Schmid et al. |
| 5,766,335 | A | 6/1998 | Bujard et al. |
| 6,284,032 | B2 | 9/2001 | Andes et al. |
| 6,630,018 | B2 | 10/2003 | Bauer et al. |
| 6,776,835 | B2 | 8/2004 | Andes et al. |

(Continued)

FOREIGN PATENT DOCUMENTS

WO    2011025126 A1    3/2011

OTHER PUBLICATIONS

Rasouli et al., Electrochemical investigation of anticorrosive properties of nano-crystalline Zn0.9 Co0.1O green ceramic pigments synthesized by microwave-assisted gel combustion method, http://indianchemicalsociety.com/, 1 page.

(Continued)

*Primary Examiner* — Michael P Wieczorek
(74) *Attorney, Agent, or Firm* — Dinsmore & Shohl LLP

(57) ABSTRACT

A method for forming a multilayer thin film having a crystalline metal oxide layer, the method including: encapsulating at least one encapsulated layer of the multilayer thin film in a wet chemical composition by wet chemical methods; and crystallizing the wet chemical composition by microwave hydrothermal treatment to form a crystalline metal oxide layer encapsulating the at least one encapsulated layer of the multilayer thin film.

20 Claims, 3 Drawing Sheets

(56) References Cited

U.S. PATENT DOCUMENTS

| | | | |
|---|---|---|---|
| 6,777,085 B1* | 8/2004 | Argoitia | C09C 1/0015 428/328 |
| 7,235,300 B2 | 6/2007 | Phillips et al. | |
| 7,382,514 B2* | 6/2008 | Hsu | C09B 67/0004 204/600 |
| 7,828,890 B2 | 11/2010 | Henglein et al. | |
| 7,976,744 B2 | 7/2011 | Bujard et al. | |
| 2004/0180010 A1 | 9/2004 | Andes et al. | |
| 2005/0013934 A1 | 1/2005 | Xiong et al. | |

OTHER PUBLICATIONS

Ying-Jie Zhu, et al., "Microwave-Assisted Preparation of Inorganic Nanostructures in Liquid Phase," ACS Publications, Jun. 4, 2014, Chem. Rev. 2014, vol. 114, pp. 6462-6555, URL: https://pubs.acs.org/doi/abs/10.1021/cr400366s.

* cited by examiner

METHODS FOR FORMING CRYSTALLINE METAL OXIDE OVER STRUCTURAL COLOR FILM USING LOW HEAT

CROSS-REFERENCE TO RELATED APPLICATIONS

This application claims the benefit of priority under 35 U.S.C. § 119 of U.S. Provisional Application Ser. No. 62/692,391, filed on Jun. 29, 2018, which is incorporated herein by reference.

FIELD

The present application is related to processes for forming multilayer thin film structures, and in particular to processes for forming multilayer thin film structures that have a crystalline metal oxide layer formed thereon using low heat crystallization.

BACKGROUND

Pigments made from multilayer structures are known. Traditional multilayer structures include a reflective layer (e.g., a metal such as Al, Au, Ag, Pt, etc.), various dielectric layers (e.g., ZnS, $TiO_2$, $ZrO_2$, etc.), various dielectric absorbing layers (e.g., $Fe_2O_3$, TiN, etc.), and various semi-transparent absorbing layers (e.g., Cr, W, etc.). These various layers are traditionally formed using high-cost vacuum deposition techniques, such as physical vapor deposition (PVD) or sputtering. In particular, it can be difficult to apply metal oxide layers (e.g., $Fe_2O_3$, $TiO_2$, etc.) using known vacuum deposition techniques.

Wet chemical deposition processes, such as sol-gel deposition, is a low-cost method that has been used to form metal oxide nanoparticles. However, crystallizing wet chemical compositions to form crystallized metal oxide layers requires high temperatures (e.g., greater than or equal to 500° C.) that are detrimental to various other layers that are present in the multilayer thin films. In particular, thin metal layers, such as semi-transparent absorbing layers made from Cr or W, can oxidize or deform at the temperatures required to crystallize wet chemical compositions to for crystallized metal oxide layers. Also, the metal reflective layer can be deformed at the temperatures required to crystallize wet chemical compositions to form crystallized metal oxide layers.

SUMMARY

According embodiments, a method for forming a multilayer thin film comprising a crystalline metal oxide layer is provided. The method comprising: encapsulating at least one encapsulated layer of the multilayer thin film in a metal oxide by wet chemical methods; and crystallizing the wet chemical composition by microwave hydrothermal treatment to form a crystalline metal oxide layer encapsulating the at least one encapsulated layer of the multilayer thin film.

According to some embodiments, the at least one encapsulated layer of the multilayer thin film is a reflective core layer, and the crystalline metal oxide layer encapsulates the reflective core layer, and the reflective core layer comprises Al, Ag, Pt, Sn, Au, Cu, brass, TiN, Cr, or a combination thereof. The crystalline metal oxide layer comprises $SnO_2$, $ZrO_2$, $CO_2O_3$, $CO_3O_4$, $Fe_2O_3$, $Fe_3O_4$, or $TiO_2$.

In some embodiments, the multilayer thin film comprises: a reflective core layer; a first layer extending across the reflective core layer; a second layer extending across the first layer; and the crystalline metal oxide layer encapsulating the second layer, the first layer, and the reflective core layer. The reflective core layer comprises Al, Ag, Pt, Sn, Au, Cu, brass, TiN, Cr, or a combination thereof; the first layer comprises at least one a dielectric material or at least one dielectric absorbing material; the second layer comprises a semi-transparent absorbing material; and the crystalline metal oxide layer comprises $Fe_2O_3$ or $TiO_2$.

In one or more embodiments, the multilayer thin film further comprises a protective layer encompassing the reflective core layer and the protective layer is present between the reflective core layer and the first layer comprising $SiO_2$, $Al_2O_3$, $ZrO_2$, or $CeO_2$. In embodiments, the protective layer is formed by encapsulating the reflective core layer in a second metal oxide by wet chemical methods, wherein the second metal oxide is different from the metal oxide.

According to some embodiments, the wet chemical composition is crystallized by heating the wet chemical composition to a temperature from 150° C. to 300° C. In embodiments, the wet chemical composition is crystallized in a microwave reactor, and a pressure within the microwave reactor during a crystallization of the wet chemical composition is from 10 bar to 30 bar.

In embodiments, the crystalline metal oxide layer is a $TiO_2$ layer comprising anatase phase $TiO_2$. In some embodiments, the crystalline metal oxide layer is an $Fe_2O_3$ layer comprising $\alpha$-Fe—$O_3$.

In one or more embodiments, the crystalline metal oxide layer has a thickness from greater than 0 nm to 250 nm, and a surface roughness (Ra) of less than 100 nm.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTIONS OF THE DRAWINGS

Figure 3A:
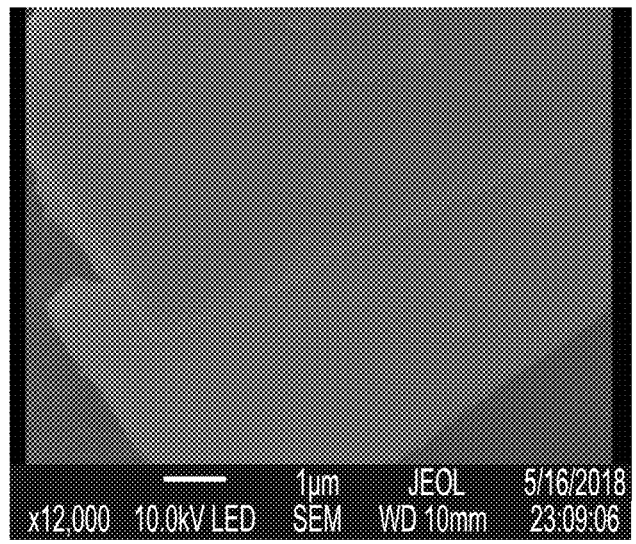
Figure 3B:
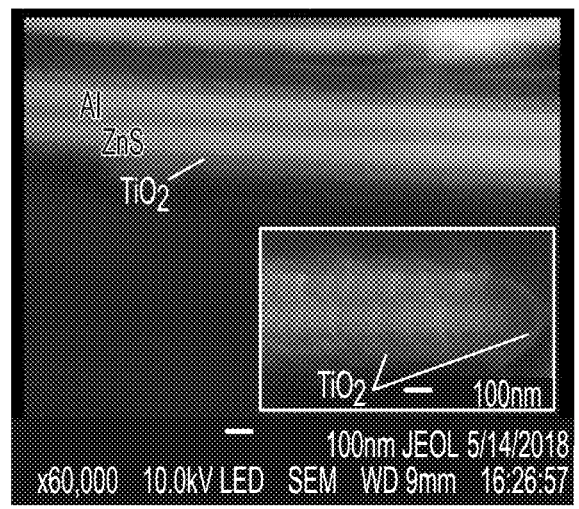
Figure 4:
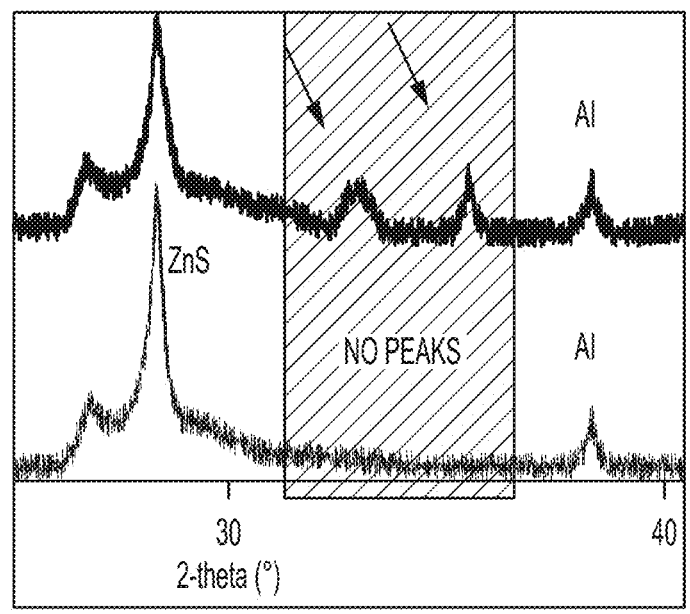

FIGS. 3A and 3B are scanning electron microscopy images of a multilayer thin film with a titanium oxide layer extending over the multilayer film structure according to embodiments disclosed and described herein; and FIG. 4 depicts x-ray powder diffraction spectra of a multilayer thin film with an iron oxide layer extending over the multilayer film structure according to embodiments disclosed and described herein.

DETAILED DESCRIPTION

A structure that produces omnidirectional structural color is provided in this disclosure. The structure that produces omnidirectional structural color has the form of a multilayer thin film (also referred to as a multilayer stack herein) that reflects a narrow band of electromagnetic radiation in the visible spectrum and has a small or non-noticeable hue shift when the multilayer thin film is viewed from angles between 0° to 45°. The multilayer thin film can be used as pigment in compositions (such as, for example, a paint composition), a continuous thin film on a structure, and the like.

In methods for forming multilayer thin films comprising at least one crystalline metal oxide layer, the structure of the multilayer thin film is not limited, and the methods disclosed and described herein can be used to form a metal oxide layer at any location within the multilayer thin film. For example, methods disclosed and described herein can be used to form a metal oxide layer across the reflective layer, or methods disclosed and described herein can be used to form a metal oxide layer as an outer layer of the multilayer thin film. In embodiments, the methods disclosed and described herein can be used to form multiple metal oxide layers within the multilayer thin film.

Figure 1:
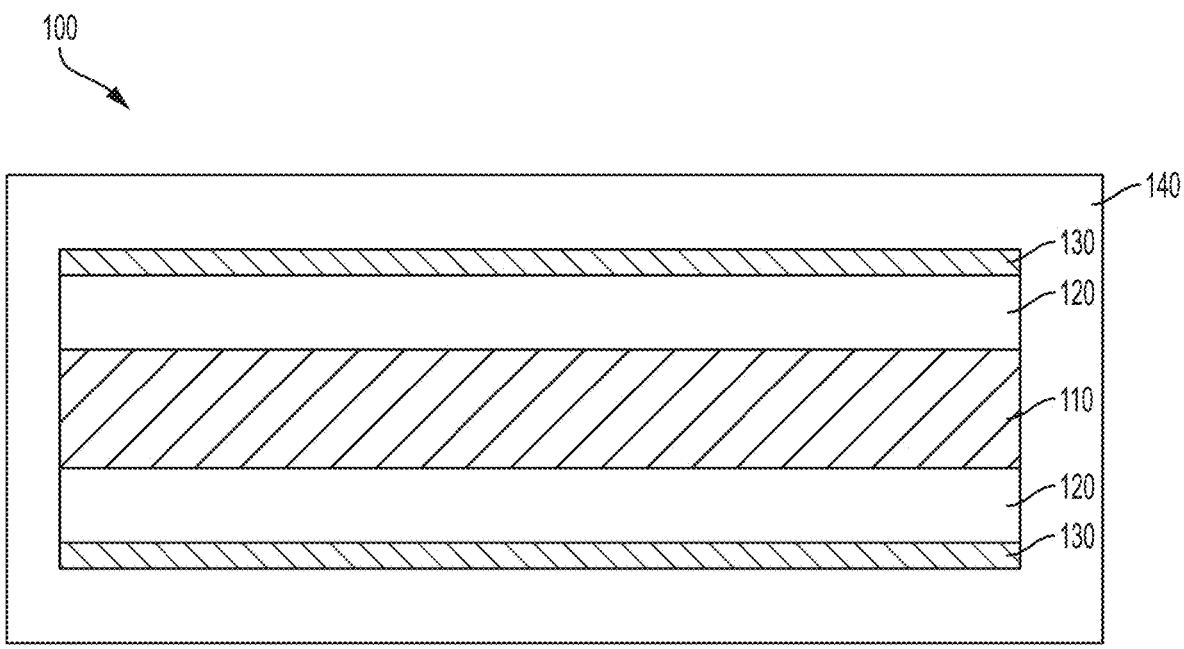
FIG. 1 is a schematic cross sections of a multilayer thin film structure according to embodiments disclosed and described herein.

With reference to FIG. 1, one exemplary and non-limiting embodiment of a multilayer thin film 100 comprises a reflective core layer 110, a first layer 120 that extends across the reflective core layer 110, a second layer 130 that extends across the second layer 120, and an outer layer 140 that encapsulates multilayer thin film comprising the core reflective layer 110, the first layer 120, and the second layer 130. In embodiments, the reflective core layer 110 is formed from a metal (e.g., Al, Au, Ag, Pt, etc.), the first layer 120 may be formed from a dielectric material (e.g., ZnS, $TiO_2$, $ZrO_2$, etc.) or a dielectric absorbing material (e.g., $Fe_2O_3$, TiN, etc.); the second layer 130 may be formed from a dielectric material that is different from the dielectric material of the first layer, a dielectric absorbing material that is different from the dielectric absorbing material of the first layer, or a semi-transparent absorbing material (e.g., Cr, W, Ni, etc.); and the outer layer 140 may be formed from a dielectric material that is different from the dielectric material of the second layer or a dielectric absorbing material that is different from the dielectric absorbing material of the second layer. In some embodiments, a protective layer (not shown) may encapsulate the core reflective layer 110 and be positioned, at least in part, between the core reflective layer 110 and the first layer 120. It should be understood that a protective layer may be needed in certain wet chemical processes, such as wet chemical processes that include an aqueous liquid. However, in embodiments where the wet chemical process comprises an organic liquid (such as, for example, alcohols and the like) a protective layer is not necessarily required.

In embodiments, the reflective core layer 110 can be made from at least one of a "gray metallic" material, such as Al, Ag, Pt, Sn; at least one of a "colorful metallic" material, such as Au, Cu, brass, TiN, Cr, or a combination thereof; the dielectric absorbing material may be at least one colorful dielectric material such as $Fe_2O_3$, TiN, or a combination thereof; the dielectric material may be ZnS, $ZrO_2$, $TiO_2$, or combinations thereof; and semi-transparent absorbing materials may be W, Cr, Ge, Ni, stainless steel, Pd, Ti, Si, V, TiN, Co, Mo, Nb, ferric oxide, or combinations thereof. In embodiments comprising a protective layer, the protective layer may be formed from $SiO_2$, $Al_2O_3$, $ZrO_2$, $CeO_2$, or combinations thereof. As disclosed hereinabove, various layers of the multilayer thin film may be formed from metal oxides, such as, for example, $Fe_2O_3$ or $TiO_2$. Such metal oxide layers, regardless of their location within the multilayer thin film, may be formed by methods disclosed and described herein.

Methods for forming crystalline metal oxide layers according to embodiments disclosed and described herein begin with traditional wet chemical processes, such as sol-gel processes. In sol-gel processes the "sol" (or solution) gradually evolves towards the formation of a gel-like diphasic system containing both a liquid phase and a solid phase whose morphologies range from discrete particles to continuous polymer networks. In the case of colloidal solutions, a significant amount of fluid may need to be removed for the gel-like properties to be recognized. This can be accomplished in any number of ways. The simplest method is to allow time for sedimentation to occur, and then pour off the remaining liquid. Centrifugation can also be used to accelerate the process of phase separation.

Wet chemical systems (i.e., liquid(s) and solid(s)), such as sol-gel systems, for forming various metal oxides, such as, for example, $Fe_2O_3$, $TiO_2$, $ZrO_2$, and the like, are known. Any known wet chemical system for forming a desired metal oxide may be used as the wet chemical system for forming one or more metal oxide layer in the multilayer thin film. In embodiments, the liquid used in the wet chemical system acidic water (e.g., pH less than or equal to 4.0), isopropanol (IPA), butanol, ethanol, isopropoxide, and the like. Exemplary wet chemical systems may are disclosed in U.S. Pat. Nos. 7,828,890; 5,624,486; 4,146,403; 4,808,231; 5,607,504; 5,766,335; 6,284,032; and 6,776,835, which are all herein incorporated by reference in their entirety. When the wet chemical system has the appropriate physical properties, such as appropriate viscosity, it may be applied to the multilayered thin film by a suitable method, such as dip coating, spin coating, spray coating, or the like. For instance, where the metal oxide is to form a layer that encapsulates the reflective core layer, the wet chemical system for the desired metal oxide may be applied to the reflective core layer. Likewise, where the metal oxide is to form an outer layer that encapsulates the multilayer thin film, the wet chemical system for the desired metal oxide may be applied to the multilayer thin film.

After the wet chemical system has been applied to the multilayer thin film, a thermal treatment is conducted that crystallizes wet chemical compositions to form a crystalline metal oxide layer. In conventional wet chemical methods, the thermal treatment is conducted at high temperatures, such as temperatures greater than or equal to 400° C. However, the high temperatures associated with conventional thermal treatments can cause damage to various other layers in the multilayer thin film, such as the metal-containing semi-transparent absorbing layers and the metallic reflective core layer. In particular, at such high temperatures, the metals in various layers have a tendency to oxidize (e.g., Cr and W when present in the semi-transparent absorbing layer and Al when present in the reflective core layer) or deform, such as by softening or bending and the like. Accordingly, it is desirable to conduct a thermal treatment that crystallizes wet chemical compositions to form a crystalline metal oxide layer at temperatures below the oxidation or deformation temperature of other metal-comprising layers.

To that end, methods for forming a multilayer structure with at least one crystallized metal oxide layer according to embodiments disclosed and described herein use a microwave hydrothermal (MWHT) treatment as the thermal treatment to the crystallize the deposited wet chemical composition and form a crystalline metal oxide layer. By using MWHT treatment, the temperature at which the wet chemical composition may be crystallized to form a crystalline metal oxide layer can be significantly decreased. In embodiments, the temperature of a thermal treatment using MWHT treatment according to embodiments may be from 150° C. to 300° C., such as from 160° C. to 300° C., from 170° C. to 300° C., from 180° C. to 300° C., from 190° C. to 300° C., from 200° C. to 300° C., from 210° C. to 300° C., from 220° C. to 300° C., from 230° C. to 300° C., from 240° C. to 300° C., from 250° C. to 300° C., from 260° C. to 300° C., from 270° C. to 300° C., from 280° C. to 300° C., or from 290° C. to 300° C. In some embodiments the temperature of a thermal treatment using MWHT treatment may be from 150° C. to 290° C., from 150° C. to 280° C., from 150° C. to 270° C., from 150 CC to 260° C. from 150° C. to 250° C., from 150° C. to 240° C., from 150° C. to 230° C., from 150° C. to 220° C., from 150° C. to 210° C., from 150° C. to 200° C., from 150 CC to 190° C., from 150° C. to 180° C., from 150 CC to 1.70° C., or from 160° C. to 210° C. In other embodiments the temperature of a thermal treatment using MWHT treatment may be from 160° C. to 290° C., from 170° C. to 280° C., from 180° C. to 270° C., from 190° C. to 260° C., from 200° C. to 250° C., from 210° C. to 240° C., or from 220° C. to 230° C.

Thermal treatments to crystallize wet chemical compositions to form crystalline metal oxide layers conducted at the foregoing temperatures are below the oxidation and deformation temperatures of many metals that will be used in the multilayer thin film. Thus, crystallizing wet chemical compositions to form crystalline metal oxide layers according to methods disclosed and described herein to form crystalline metal oxide layers can be achieved without the oxidation or damage caused by conventional thermal treatments used with wet chemical processes. Without being bound to any particular theory, it is believed that low temperature thermal treatment is sufficient for crystallization in MWHT process because of the rapid and uniform heating within a supersaturated liquid phase of the wet chemical system, so that a lower activation energy of crystallization is believed to be present in MWHT treatment compared to that in conventional solid-state sintering process. In addition, the MWHT treatment comprises two distinct heating mechanisms: (1) hydrothermal reactions; and (2) microwave heating. These two mechanisms provide uniform heating of the wet chemical composition as the hydrothermal treatment heats the solid components of the wet chemical composition from the outside and the microwaves penetrate the solid components of the wet chemical composition and heat it from the inside. Thus, heating the wet chemical composition by MWHT treatment is more efficient and uniform than conventional crystallization processes.

After the wet chemical system has been applied to the multilayer thin film, such as by dip coating, spin coating, spray coating, or the like, the multilayer thin film may be placed inside a microwave reactor to conduct the MWHT treatment. The microwave reactor may, in embodiments, be run until the temperature of the multilayer thin film reaches the crystallization temperatures disclosed above (e.g., from 150° C. to 300° C.). In addition to controlling the temperature of the multilayer thin film within the microwave reactor, the pressure inside the microwave reactor during the crystallization of the wet chemical composition may also be controlled. In embodiments, the pressure within the microwave reactor during crystallization may be from 10 bar to 30 bar, such as 12 bar to 30 bar, from 14 bar to 30 bar, from 16 bar to 30 bar, from 18 bar to 30 bar, from 20 bar to 30 bar, from 22 bar to 30 bar, from 24 bar to 30 bar, from 26 bar to 30 bar, from 28 bar to 30 bar. In embodiments, the pressure within the microwave reactor during crystallization may be from 10 bar to 28 bar, such as from 10 bar to 26 bar, from 10 bar to 24 bar, from 10 bar to 22 bar, from 10 bar to 20 bar, from 10 bar to 18 bar, from 10 bar to 16 bar, from 10 bar to 14 bar, or from 10 bar to 12 bar. In some embodiments, the pressure within the microwave reactor during crystallization may be from 22 bar to 28 bar, such as from 24 bar to 26 bar, from 26 bar to 30 bar, or from 28 bar to 30 bar. The duration of the MWHT treatment is shorter than the duration of traditional crystallization processes used in wet chemical methods. In embodiments, the duration of the MWHT treatment is less than 60 minutes, such as less than 45 minutes, less than 30 minutes, less than 20 minutes, less than 15 minutes, less than 10 minutes, or less than 5 minutes. The reduced duration of the MWHT treatment to crystallize wet chemical compositions compared to conventional crystallization processes further reduces the cost of the methods for forming multilayer thin films having crystalline metal oxide layers according to embodiments disclosed and described herein by, for example, increasing the amount of multilayer thin films that can produced in a given period of time.

The temperature to which the multilayer thin film is heated within the microwave reactor, the pressure within the microwave reactor, and the duration of the MWHT treatment may be modified based on the wet chemical system used to form the crystalline metal oxide layer of the multilayer thin film. For instance, wet chemical systems comprising an aqueous component may require higher temperatures, but less duration, than wet chemical systems comprising an organic liquid component. Although the MWHT treatment is not limited to any particular type of microwave reactor, in embodiments, the MWHT treatment may be conducted in a microwave reactor with 2.54 GHz frequency.

Crystalline metal oxide layers formed according to method disclosed and described herein have various properties that may be attributed to being deposited by wet chemical deposition and crystallized by MWHT treatment. One such property of crystalline metal oxide layers formed according to embodiments disclosed and described herein is that the crystalline metal oxide layers are formed with a high degree of uniformity. The uniformity is imparted to the crystalline metal oxide layer, in part, because wet chemical deposition and MWHT treatment form a metal oxide layer with few or no aggregates of metal oxide particles that can disrupt the uniformity of the crystalline metal oxide layer. The uniformity of the crystalline metal oxide layer can be determined by measuring the Ra surface roughness of the crystalline metal oxide layer. In embodiments, the surface roughness of the crystalline metal oxide layer is less than 100 nm, such as less than 90 nm, less than 80 nm, less than 70 nm, less than 60 nm, less than 50 nm, less than 40 nm, less than 30 nm, less than 20 nm, or less than 10 nm. The uniformity of the crystalline metal oxide layer can also be determined by visually inspecting scanning electron microscopy (SEM) images of the crystalline metal oxide layer. A person of ordinary skill in the art will be able to visually ascertain divots and protrusions in the crystalline metal oxide layer that would be detrimental to the uniformity of the crystalline metal oxide layer by viewing SEM images of the crystalline metal oxide layer. For example, if one can visually detect the layer beneath the crystalline metal oxide layer in the SEM image of the crystalline metal oxide layer, the uniformity is not sufficient.

Another property of the crystalline metal oxide layer that may be controlled by the wet chemical system is the thickness of the crystalline metal oxide layer. As disclosed above, different wet chemical systems may be used in methods disclosed and described herein, and the wet chemical system may be chosen to provide a crystalline metal oxide with a particular thickness. In embodiments, the thickness of crystalline metal oxide layer may be from greater than 0 nm to 250 nm, such as from 20 nm to 250 nm, from 40 nm to 250 nm, from 60 nm to 250 nm, from 80 nm to 250 nm, from 100 nm to 250 nm, from 120 nm to 250 nm, from 140 nm to 250 nm, from 160 nm to 250 nm, from 180 nm to 250 nm, from 200 nm to 250 nm, from 220 nm to 250 nm, or from 240 nm to 250 nm. In embodiments, the thickness of crystalline metal oxide may be from greater than 0 nm to 240 nm, such as from greater than 0 nm to 220 nm, from greater than 0 nm to 200 nm, from greater than 0 nm to 180 nm, from greater than 0 nm to 160 nm, from greater than 0 nm to 140 nm, from greater than 0 nm to 120 nm, from greater than 0 nm to 100 nm, from greater than 0 nm to 80 nm, from greater than 0 nm to 60 nm, from greater than 0 nm to 40 nm, or from greater than 0 nm to 20 nm. In some embodiments, the thickness of crystalline metal oxide may be from 20 nm to 240 nm, such as from 40 nm to 220 nm, from 60 nm to 200 nm, from 80 nm to 180 nm, from 100 nm to 160 nm, or from 120 nm to 140 nm.

Figure 2:
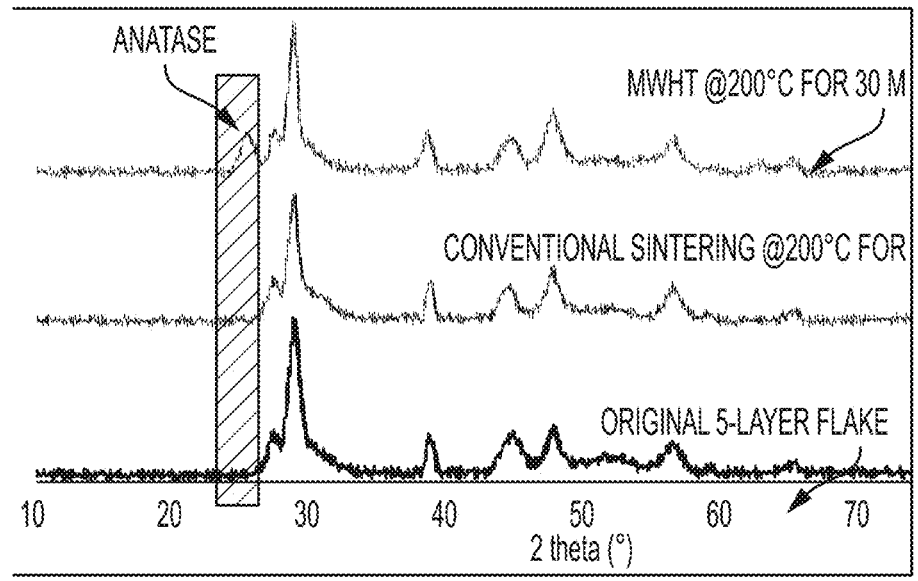
FIG. 2 depicts x-ray powder diffraction spectra of a multilayer thin film with a titanium oxide layer extending over the multilayer film structure according to embodiments disclosed and described herein.

In an embodiment, a multilayer thin film having a five-layer structure (Al reflective core layer, ZnS dielectric layer extending across the reflective core layer, and Cr absorbing layer extending across the dielectric layer) was formed and titanium iso-propoxide (TTIP) was used as precursor to form a titanium oxide layer via a wet chemical process (i.e., a sol-gel process). The titanium oxide layer encapsulates the five-layer thin film structure. With reference to FIG. 2, the resulting multilayer thin film having a $TiO_2$ encapsulating layer was analyzed using x-ray powder diffraction (XRD) spectra that clearly show the formation of an anatase phase of $TiO_2$, while there is no such formation by conventional sintering. FIG. 2 shows XRD spectra for a multilayer thin film formed according to embodiments disclosed and described herein (top XRD spectra), XRD spectra for a multilayer thin film formed by a conventional crystallization process at reduced temperature (middle XRD spectra), and XRD spectra for a multilayer film formed by conventional crystallization processes (bottom XRD spectra). The anatase phase $TiO_2$ is shown in the XRD spectra as the very first peak in the top XRD spectra shown in FIG. 2, which is not present in the middle and bottom XRD spectra shown in FIG. 2. With reference now to FIGS. 3A and 3B, SEM images of both surface (FIG. 3A) and cross-section (FIG. 3B) of the multilayer thin film are provided and show the uniform $TiO_2$ layer of about 60 nm encapsulating the multilayer thin film after MWHT process.

Similarly, in an embodiment, a multilayer thin film having a five-layer structure (Al reflective core layer, ZnS dielectric layer extending across the reflective core layer, and Cr absorbing layer extending across the dielectric layer) was formed and acidic water (pH of 3.5) was used as precursor to form an iron oxide layer via a wet chemical process (i.e., a sol-gel process). The iron oxide layer encapsulates the five-layer thin film structure. With reference to FIG. 4, the resulting multilayer thin film having a $Fe_2O_3$ encapsulating layer was analyzed using XRD spectra that clearly shows the formation of $\alpha$-$Fe_2O_3$, while there is no such formation by conventional sintering. FIG. 4 discloses XRD spectra for a multilayer thin film formed according to embodiments disclosed and described herein (top XRD spectra in FIG. 4) and formed by conventional crystallization processes (bottom XRD spectra in FIG. 4). The $\alpha$-$Fe_2O_3$ is visible on the XRD spectra as two major representative peaks present in the top XRD spectra of FIG. 4, which are not present in the bottom XRD spectra of FIG. 4.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for forming a multilayer thin film comprising a crystalline metal oxide layer, the method comprising:
    encapsulating at least one encapsulated layer of the multilayer thin film in a wet chemical composition by wet chemical methods; and
    crystallizing the wet chemical composition by microwave hydrothermal treatment to form a crystalline metal oxide layer encapsulating the at least one encapsulated layer of the multilayer thin film,
    wherein the multilayer thin film produces an omnidirectional structural color.

2. The method of claim 1, wherein the at least one encapsulated layer of the multilayer thin film is a reflective core layer, and the crystalline metal oxide layer encapsulates the reflective core layer.

3. The method of claim 2, wherein the reflective core layer comprises Al, Ag, Pt, Sn, Au, Cu, brass, TiN, Cr, or a combination thereof, and
    the crystalline metal oxide layer comprises $SnO_2$, $ZrO_2$, $CeO_2$, $Co_3O_4$, $Co_2O_3$, $Fe_2O_3$, $Fe_3O_4$ or $TiO_2$.

4. The method of claim 1, wherein the multilayer thin film comprises:
    a reflective core layer;
    a first layer extending across the reflective core layer;
    a second layer extending across the first layer; and
    the crystalline metal oxide layer encapsulating the second layer, the first layer, and the reflective core layer.

5. The method of claim 4, wherein
    the reflective core layer comprises Al, Ag, Pt, Sn, Au, Cu, brass, TiN, Cr, or a combination thereof,
    the first layer comprises at least one a dielectric material or at least one dielectric absorbing material,
    the second layer comprises a semi-transparent absorbing material, and
    the crystalline metal oxide layer comprises $Fe_2O_3$ or $TiO_2$.

6. The method of claim 4, wherein the multilayer thin film further comprises a protective layer encompassing the reflective core layer and the protective layer is present between the reflective core layer and the first layer.

7. The method of claim 6, wherein
    the reflective core layer comprises Al, Ag, Pt, Sn, Au, Cu, brass, TiN, Cr, or a combination thereof,
    the protective layer comprises $SiO_2$, $Al_2O_3$, $ZrO_2$, or $CeO_2$,
    the first layer comprises at least one a dielectric material or at least one dielectric absorbing material,
    the second layer comprises a semi-transparent absorbing material, and
    the crystalline metal oxide layer comprises $Fe_2O_3$ or $TiO_2$.

8. The method of claim 6, wherein the protective layer is formed by encapsulating the reflective core layer in a second wet chemical composition by wet chemical methods, wherein the second wet chemical composition is different from the wet chemical composition; and
crystallizing the second wet chemical composition by microwave hydrothermal treatment to form a second crystalline metal oxide layer encapsulating the reflective core layer.

9. The method of claim 1, wherein the wet chemical composition is crystallized by heating the wet chemical composition to a temperature from 150° C. to 300° C.

10. The method of claim 9, wherein the crystalline metal oxide layer comprises $TiO_2$ that was crystallized by heating the wet chemical composition to a temperature from 150° C. to 200° C. to form a crystalline $TiO_2$ layer.

11. The method of claim 10, wherein the crystalline $TiO_2$ layer comprises anatase phase $TiO_2$.

12. The method of claim 9, wherein the crystalline metal oxide layer comprises $Fe_2O_3$ and was crystallized by heating the wet chemical composition to a temperature from 150° C. to 250° C. to form a crystalline $Fe_2O_3$ layer.

13. The method of claim 12, wherein the crystalline $Fe_2O_3$ layer comprises $\alpha$-$Fe_2O_3$.

14. The method of claim 1, wherein the wet chemical composition is crystallized in a microwave reactor, and
a pressure within the microwave reactor during a crystallization of the wet chemical composition is from 10 bar to 30 bar.

15. The method of claim 1, wherein the crystalline metal oxide layer has a thickness from greater than 0 nm to 250 nm.

16. The method of claim 1, wherein the crystalline metal oxide layer has a surface roughness (Ra) of less than 100 nm.

17. A method forming a multilayer thin film comprising a reflective core layer, a crystalline metal oxide layer encapsulating the reflective core layer, a first layer extending across the crystalline metal oxide layer, and a second layer extending across the first layer, wherein:
the crystalline metal oxide layer is formed by:
encapsulating the reflective core layer in a wet chemical composition by wet chemical methods; and
crystallizing the wet chemical composition by microwave hydrothermal treatment to form a crystalline metal oxide layer encapsulating the reflective core layer; and
the multilayer thin film produces an omnidirectional structural color.

18. The method of claim 17, wherein
the reflective core layer comprises Al, Ag, Pt, Sn, Au, Cu, brass, TiN, Cr, or a combination thereof,
the crystalline metal oxide layer comprises $Fe_2O_3$;
the first layer comprises a semi-transparent absorbing material, and
the second layer comprises at least one dielectric material or at least one dielectric absorbing material.

19. The method of claim 18, wherein the microwave hydrothermal treatment is conducted to heat the wet chemical composition to temperature from 150° C. to 250° C.

20. The method of claim 18, wherein the crystalline metal oxide layer has a surface roughness (Ra) less than 100 nm.

* * * * *

UNITED STATES PATENT AND TRADEMARK OFFICE
CERTIFICATE OF CORRECTION

PATENT NO. : 10,882,996 B2
APPLICATION NO. : 16/258065
DATED : January 5, 2021
INVENTOR(S) : Songtao Wu et al.

Page 1 of 1

It is certified that error appears in the above-identified patent and that said Letters Patent is hereby corrected as shown below:

In the Specification

In Column 2, Line(s) 30, delete "α-Fe—O$_3$." and insert -- α-Fe$_2$O$_3$ --, therefor.

In Column 5, Line(s) 21, delete "150 CC" and insert -- 150° C --, therefor.

In Column 5, Line(s) 24, delete "150 CC" and insert -- 150° C --, therefor.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*